United States Patent
Heatley (10) Patent No.: US 7,222,031 B2
(45) Date of Patent: May 22, 2007

(54) POWER SUPPLY FOR TETHERLESS WORKSTATIONS

(75) Inventor: David Heatley, Felixstowe (GB)

(73) Assignee: British Telecommunications public limited company, London (GB)

( * ) Notice: Subject to any disclaimer, the term of this patent is extended or adjusted under 35 U.S.C. 154(b) by 534 days.

(21) Appl. No.: 10/468,280

(22) PCT Filed: Mar. 11, 2002

(86) PCT No.: PCT/GB02/01094

§ 371 (c)(1),
(2), (4) Date: Aug. 19, 2003

(87) PCT Pub. No.: WO02/073769

PCT Pub. Date: Sep. 19, 2002

(65) Prior Publication Data

US 2005/0158616 A1  Jul. 21, 2005

(30) Foreign Application Priority Data

Mar. 13, 2001 (GB) ............................. 0106147.2
Aug. 8, 2001 (EP) ............................. 01306763

(51) Int. Cl.
*G01R 31/36* (2006.01)

(52) U.S. Cl. ................................................. 702/63

(58) Field of Classification Search ............ 702/60–63; 320/134, 136
See application file for complete search history.

(56) References Cited

U.S. PATENT DOCUMENTS

| 5,654,623 | A  | * | 8/1997  | Shiga et al. ............... 320/106 |
| 6,794,849 | B2 | * | 9/2004  | Mori et al. ............... 320/107 |
| 7,003,411 | B2 | * | 2/2006  | Bertness ................... 702/63 |
| 7,046,682 | B2 | * | 5/2006  | Carpenter et al. ......... 370/401 |
| 7,116,230 | B2 | * | 10/2006 | Klowak ................. 340/572.1 |
| 2002/0047687 | A1 | * | 4/2002 | Chen ..................... 320/132 |

FOREIGN PATENT DOCUMENTS

WO  02/073769  *  9/2002

* cited by examiner

*Primary Examiner*—Michael P. Nghiem
(74) *Attorney, Agent, or Firm*—Nixon & Vanderhye P.C.

(57) ABSTRACT

A tetherless workstation is provided having a rechargeable battery power supply installed therein for supplying electrical power to equipment associated with the workstation. The battery power supply includes a diagnostics interface for monitoring an indication of at least the battery charge level and for outputting that indication together with a unique identifier stored within the power supply for transmission over a wireless communications interface. A monitoring apparatus is also provided to monitor the operational status of tetherless workstations using indications output by their respective power supplies, for logging usage of workstations and for generating reports on their operational status, including predictions relating to their operational status.

14 Claims, 4 Drawing Sheets

POWER SUPPLY FOR TETHERLESS WORKSTATIONS

This application is the US national phase of international application PCT/GB02/01094 filed Mar. 11, 2002 which designated the U.S.

BACKGOUND

1. Technical Field

The present invention relates generally to power management in flexible office arrangements and, in particular, to power supplies for use in tetherless workstations capable of supporting a range of electronic communications facilities in a tetherless manner, and to facilities for the management of such power supplies.

2. Related Art

Modern office accommodation is required to support ever increasing demands for flexible working arrangements. Whereas in the past, most office workers generally occupied or at least retained the use of a desk full time, during office hours, an increasing proportion of people now work partly from home, using standard office accommodation on an ad hoc basis for particular tasks. For such people, it is generally uneconomical to reserve desk space for their exclusive but only part time use. In response to this, so called "hot desking" arrangements have been devised whereby particular desks or whole sections of office space are set aside to be booked on an ad hoc basis by individuals needing desk space for only short periods, from an hour or so to several days at a time. Each such desk offers a standard package of communication facilities, including a telephone, and a personal computer, or at least a port for connecting a portable laptop computer, with access to network services such as local printing, intranet/internet access and e-mail.

However, while such hot-desk arrangements are relatively easy to provide and to manage on an individual basis where the office furniture and communications facilities are otherwise conventional, there is increasing demand for flexible office arrangements whereby a team of users may set up a customised office arrangement for a short period of time according to their particular needs or preferences. To help address this need, the Applicant has provided a range of moveable office furniture under the futurespace™ brand, including a moveable desk providing a standard range of communications facilities operating in an entirely tetherless manner. A rechargeable battery power supply unit (PSU) is installed in the desk, providing power for a low voltage flat panel display, wireless LAN interface, cordless DECT-standard telephone and other powered items that a user might require, e.g. desk lamp, mobile phone charger. A wireless keyboard and mouse are also provided for communicating with an optionally installed personal computer using radio or infra-red signalling. The battery PSU includes an inverter for providing mains power within the desk, the battery having sufficient capacity to power the desk's computing and communications facilities under typical loading for at least a working day. At the end of each working day, a procedure is enacted for moving the desks to a point where they can be connected to the office mains outlet for overnight recharging. The connection itself can be by means of a conventional plug and socket or inductive coupling.

So called "tetherless" desks, such as that above, can be easily moved into place to form customised office arrangements. With relatively small number of such desks in a given area, keeping the PSU batteries charged and the desks operational is quite straightforward. However, where a large number of such desks are in use in a given office or building, management of the desk population is a more complex undertaking. In particular, differing demands on a desk's power supply, limited battery life (expressed as the number of charge-discharge cycles), call for and provide opportunities for a more effective management process.

BRIEF SUMMARY

According to a first aspect of the present invention, there is provided a battery power supply, comprising:
 a battery pack;
 an inlet for an externally supplied charging current;
 a store for storing a unique identifier for said battery power supply;
 a diagnostics interface arranged to monitor and to output at least an indication of the level of charge in said battery pack, and to output said unique identifier stored in said store; and
 a wireless communications interface for transmitting an output from said diagnostics interface.

A battery power supply according to this first aspect may be readily used as a source of electrical power in a number of different tetherless applications.

According to a second aspect of the present invention, there is provided a tetherless workstation having installed therein a battery power supply according to said first aspect.

According to a third aspect of the present invention there is provided an apparatus, for monitoring a plurality of battery power supplies according to said first aspect of the present invention, comprising:
 a wireless communications interface for receiving signals output from the diagnostics interface of a battery power supply; and
 means, responsive to data received at said wireless communications interface, to generate reports relating to the operational status of said battery power supplies.

According to a fourth aspect of the present invention there is provided an apparatus, for monitoring a plurality of tetherless workstations according to said second aspect of the present invention, comprising:
 a wireless communications interface for receiving signals output from the diagnostics interface of a battery power supply;
 a store for storing, in respect of each of said plurality of tetherless workstations, a unique workstation identifier and the unique identifier of a battery power supply installed therein; and
 means, responsive to data received at said wireless communications interface and to data stored in said store, for generating reports relating to the operational status of said tetherless workstations.

According to preferred embodiments of an apparatus according to said fourth aspect, there are provided alternatively or in combination: means for storing a usage log in respect of at least one of said workstations; analysis means for analysing data received at said wireless communications interface and data stored in said usage log and for generating predictions relating to the operational status of said tetherless workstations; means for identifying users of said tetherless workstations and including in said usage log data identifying respective users; and analysis means arranged to generate predictions relating to the operational status of at least one of said workstations in respect of a particular user.

According to a fifth aspect of the present invention there is provided a flexible office arrangement comprising a plurality of tetherless workstations according said second aspect, and an apparatus for monitoring said plurality of workstations according to said fourth aspect.

BRIEF DESCRIPTION OF THE DRAWINGS

Preferred embodiments of the present invention will now be described in detail, by way of example only, with reference to the accompanying drawings of which.

DETAILED DESCRIPTION OF EXEMPLARY EMBODIMENTS

Figure 1:
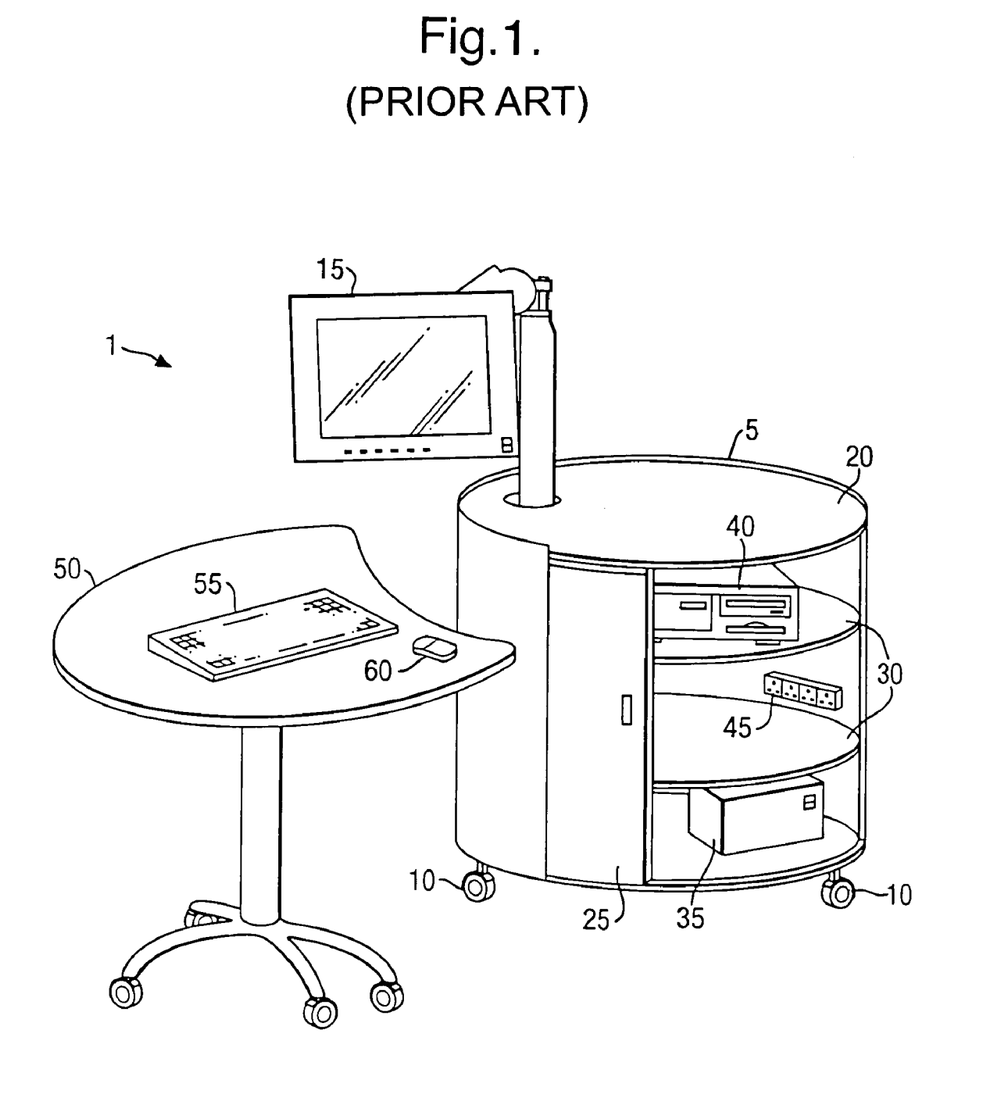
FIG. 1 is a diagram showing a known design for a tetherless desk arrangement.

Referring to FIG. 1, a known tetherless desk arrangement 1 is shown as made available under the Applicant's futurespace™ brand, suitable for use in implementing preferred embodiments of the present invention. The arrangement 1 comprises a cabinet 5 mounted on castors 10. The cabinet 5 carries a low voltage flat panel display 15 and is provided with a work surface 20 and a slidably mounted door 25 (shown approximately two thirds open) giving access to the interior of the cabinet 5. The interior of the cabinet 5 is fitted with shelves 30, a battery power supply unit (PSU) 35, an optional personal computer (PC) 40 linked to the display 15 and one or more mains power outlets 45 supplied from the PSU 35 for connecting electrical equipment, including PC 40, required by a user of the desk arrangement 1. Also provided in the desk arrangement 1 is a separately moveable table 50 providing a separate work surface on which may be placed a wireless keyboard 55 and mouse 60 for use with the optional PC 40.

In the known tetherless desk arrangement of FIG. 1, the PSU 35 comprises a battery charger, a battery pack and an inverter to provide a mains voltage alternating current output for use in powering electrical equipment such as the PC 40, or other equipment required by a user of the desk arrangement 1. The PSU 35 may also provide a battery charge level indicator mounted on the PSU itself or extended by a cable to a position on the surface 20 of the cabinet 5. Battery charge level may be indicated for example by an easily read voltmeter or a simple colour-coded electro-luminescent device. Users are then able to respond to a reading of a low battery charge level if such were to occur during working hours, and so avoid problems of a power failure, perhaps moving the desk to a position for connection to a mains outlet or to the vicinity of an inductive loop for recharging, and continuing work on another desk. Similarly, at the end of each working day, each desk may be quickly inspected for low battery charge level and moved to a position for over-night recharging.

There will now be described, according to a preferred embodiment of the present invention, with reference to FIG. 2, an improved power supply unit (PSU) and associated equipment to facilitate improved monitoring and management of tetherless desk arrangements. The PSU to be described may be installed in tetherless desk arrangements similar to that shown in FIG. 1 and is particularly suited to the monitoring and management of a large number of such tetherless desks, or to those distributed over a large office space or over a number of floors.

Figure 2:
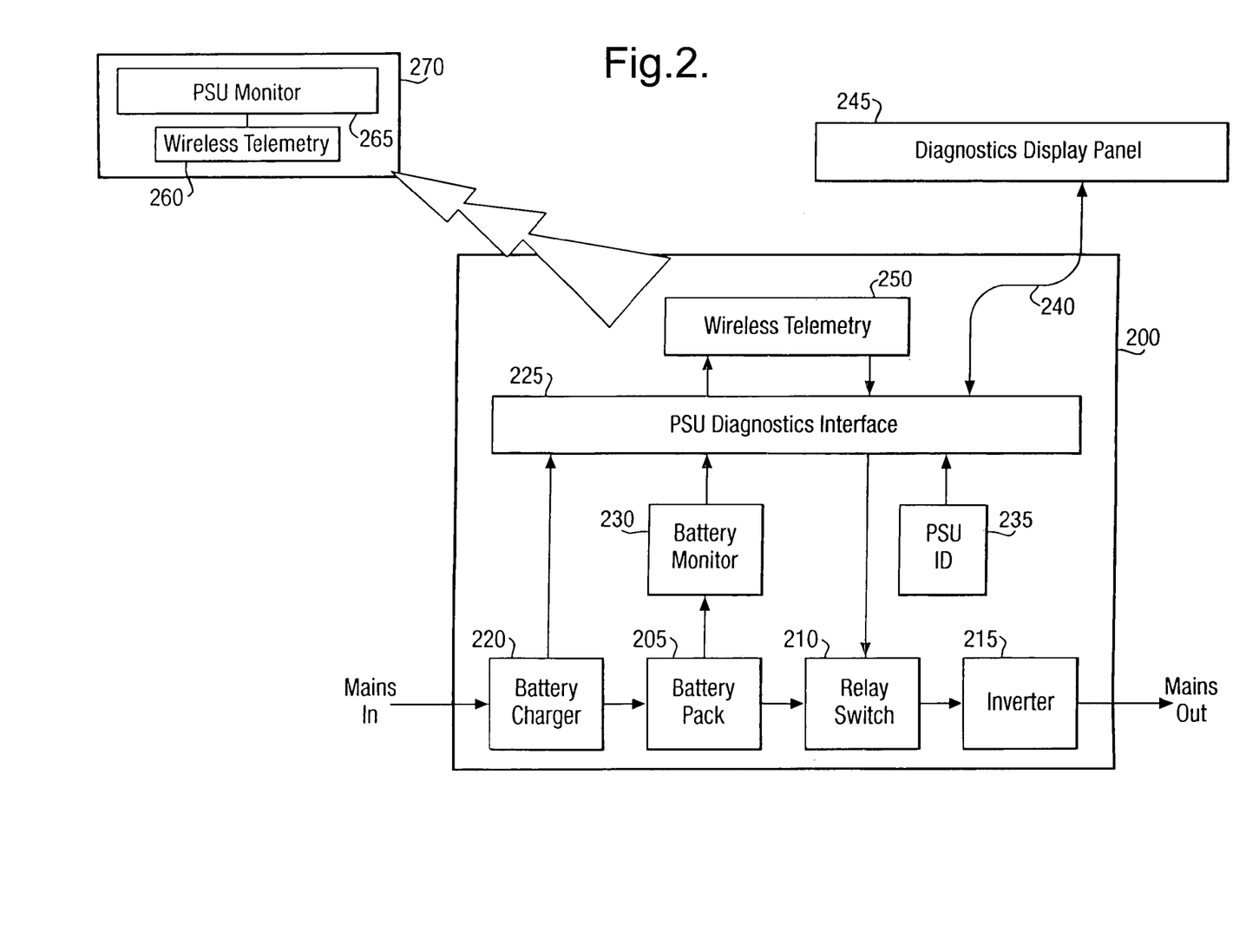
FIG. 2 is a diagram showing the features of a battery power supply unit according to a preferred embodiment of the present invention.

Referring to FIG. 2, a diagram is provided to show in particular the functional features of a preferred PSU 200. The PSU 200 comprises a battery pack 205 connected, via a relay switch 210, to an inverter 215 for producing a mains voltage electrical power output. A battery charger 220, connectable to a mains supply for recharging purposes, is also connected to the battery pack 205 within the PSU 200. The PSU 200 is also provided with a PSU diagnostics interface 225 to provide access from outside the PSU 200 to various diagnostic parameters useful for monitoring the status and use of the PSU. In particular, the diagnostics interface 225 is linked to: the battery charger 220 for receiving indications relating to use of the charger 220; a battery monitor 230 providing an indication of the battery pack voltage and current output; the relay switch 210, enabling power output from the PSU 200 to be enabled or disabled via the PSU diagnostics interface 225; and to a store 235 for storing a unique identifier for the PSU 200.

To enable diagnostic parameters to be read from outside the PSU 200, any one of a number of possible techniques may be used to read or display data accessible from the diagnostics interface 225. In the particular embodiment shown in FIG. 2, the diagnostics interface 225 may be linked by one or both of a cable 240 leading to a diagnostics display panel 245, and a wireless telemetry transmitter/receiver 250. The display panel 245 may be mounted either on the PSU housing itself or it may be mounted in a visible position for example on the surface 20 of a desk cabinet 5, as in FIG. 1, having the PSU 200 installed therein, the cable 240 being extended as necessary. The diagnostic display panel 245 may alternatively be linked to the diagnostics interface 225 by one of a number of different short-range wireless techniques should the desk design preclude the possibility or desirability of using a cable 240.

As an alternative to the use of a display panel 245, use may be made of a display screen mounted on the desk having the PSU 200 installed therein, such as the flat panel display 15 shown in FIG. 1, to display diagnostics data output by the diagnostics interface 225. For example, a video overlay device may be installed within the PSU 200 or within the desk to receive an output from the diagnostics interface 225 and to superimpose an image on the display 15 when in use, either permanently or periodically for only a few moments at a time. In another method, the interface 225 may be linked to a serial port on a PC provided in the desk, and a computer program may be installed to run on the PC to receive input from the interface 225 and to display diagnostic data in a window as part of the windows environment running on the PC.

Use of a wireless telemetry transmitter/receiver 250 enables diagnostic information for the PSU 200 to be relayed to a remote location. Preferably, at the remote location, a more or less sophisticated monitoring apparatus 270 is provided comprising a wireless telemetry transmitter/receiver 260 linked to a PSU monitor 265. The PSU monitor 265 may be a simple display device or a PC running a computer program to gather output of the diagnostic interfaces 225 of a number of PSUs 200 for processing, storage analysis and/or display. Each transmission of diagnostic parameter data from diagnostic interface 225, via telemetry transmitter/receiver 250, includes the PSU identifier (235) to enable the source of the parameter data to be determined at the remote monitoring apparatus 270. Any combination of one or more of the above-mentioned diagnostic parameters may be transmitted continuously or, preferably, at predetermined time intervals to minimise the loading on the battery pack 205.

Other known methods of wireless communication may be used to relay diagnostic information from the PSU 200 to a remote location. For example, if the desk is provided with a wireless LAN interface, then the PSU 200 may be allocated an IP address and communication to and from the diagnostics interface 225 may be achieved over the LAN in a conventional way, in addition to or as an alternative to the wireless telemetry transmitter 250. However, if the LAN is likely to be out of service from time to time, continued availability of an independent wireless technique specifically associated with the PSU 200 itself, such as the telemetry interface 250, is to be preferred.

The diagnostics interface 225 may be provided with access to any combination of one or more of the diagnostic parameters mentioned above. For example, a simple battery charge level indication may be received at the interface 225 from the battery monitor 230, represented by a voltage measurement of the battery pack 205, and the battery charge level represented by that voltage measurement may be displayed as a three colour graded charge level indication on the display panel 245 or at the remote monitoring apparatus 270. A more complete diagnostic information display at the panel 245 or remote apparatus 270 may comprise charger status, battery charge level, battery output current, PSU on/off status and PSU identifier (235). The panel 245 or remote apparatus 270 may include an ON/OFF switch, linked via the diagnostics interface 225 to the relay switch 210, to enable or disable the output of mains power output from the PSU 200.

Preferably, any module operating within the PSU 200 and requiring a source of electrical power may obtain that power from the battery pack 205. It is therefore desirable that the consumption of electrical power by such modules be minimised, for example by periodic rather than continuous operation.

Figure 3:
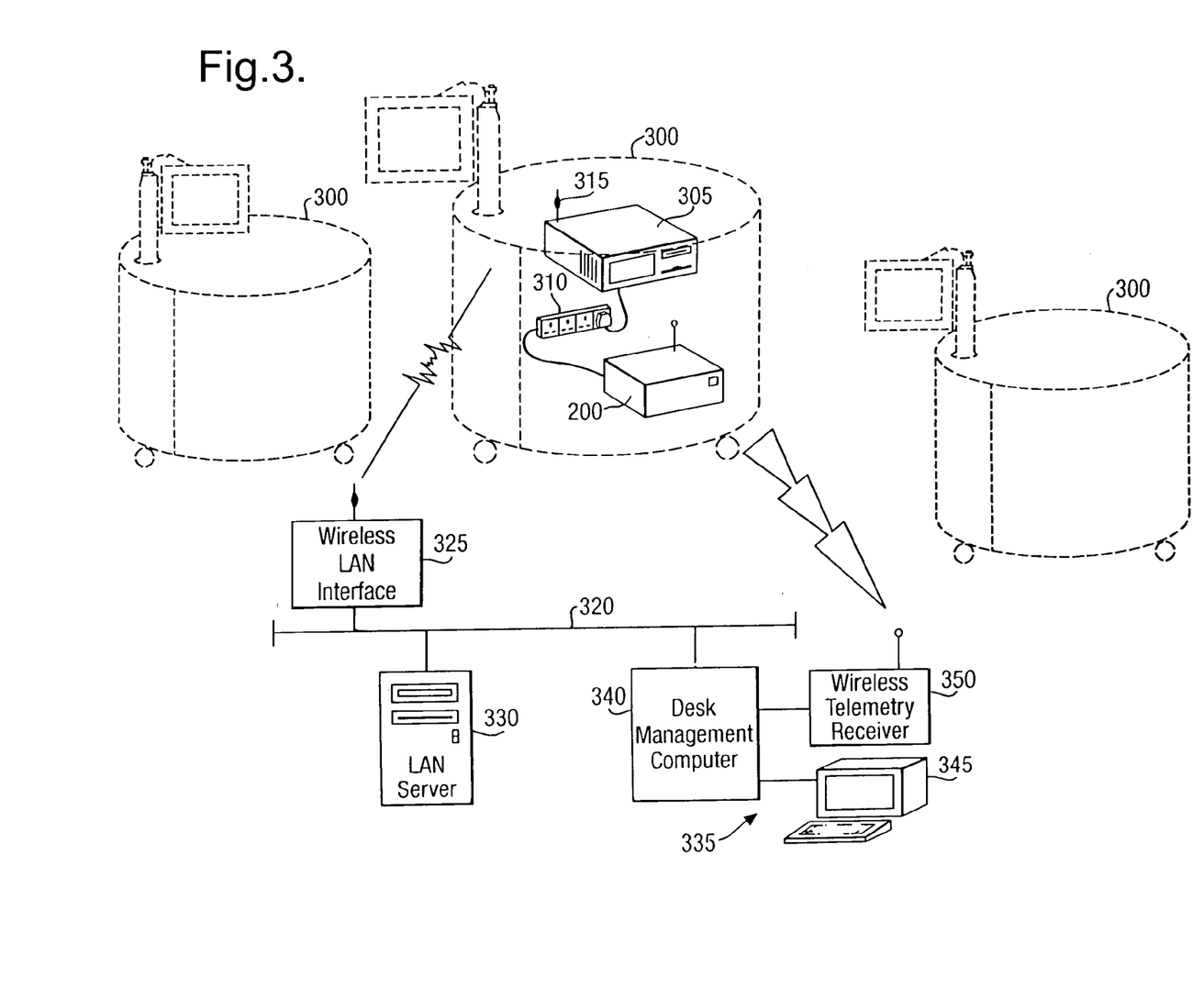
FIG. 3 is a diagram showing features of a flexible office arrangement according to a preferred embodiment of the present invention.

There will now be described, with reference to FIG. 3, a preferred arrangement for a so-called "flexible office" using tetherless desks of a design similar to those of FIG. 1, each having a PSU 200 installed therein. The arrangement shown in FIG. 3 is somewhat simplified in comparison with a typical real implementation, there being only three tetherless desks shown together with a simple office LAN arrangement. In practice, there are likely to be many more desks being used, amply justifying deployment of a desk management system to be described in more detail later.

Referring to FIG. 3, three tetherless desks 300 are shown, in dotted outline (for simplification, comprising only the cabinet portions 5 of the desk arrangements 1 of FIG. 1), one of which is explicitly shown to be containing a PSU 200 and a PC 305 connected to a mains outlet socket 310 supplied with mains electricity from the PSU 200. The PC 305 is provided with a wireless LAN interface 315 to enable communication with a locally provided LAN 320, which may itself be totally wireless, via a corresponding wireless LAN interface 325. The LAN 320 includes a LAN server 330 to provide local data storage and access to common application programs. In practice a LAN 320 also provides users of the tetherless desks 300 with access to local printing facilities, e-mail and Internet/intranet access, none of which are shown in FIG. 3 by way of simplification.

Also shown linked to the LAN 320 in FIG. 3 is a desk management system 335 comprising a desk management computer 340, a display terminal 345 and a wireless telemetry transmitter/receiver 350. Apparatus and functions of the desk management system 335 will be described in more detail below. However, as with the simple PSU monitoring apparatus 270 of FIG. 2, the desk management system is arranged to receive, via wireless telemetry transmitter/receiver 350, diagnostic data transmitted by the PSUs 200 mounted in the desks 300, and to make such data available at a location more or less remote from the desks 300 themselves. According to preferred embodiments of the present invention, the desk management system may be arranged to interpret those data and to make certain data available to a user via the display screen 345 to enable desk management decisions to be made in respect of particular desks 300 or groups of desks 300. For example, the desk management computer 340 may store or may have access to a database recording a cross-reference between pre-allocated desk identifiers (marked in a visually prominent position on the desks 300 themselves) and PSU identifiers (235) of the respective PSUs 200 mounted therein. On receipt by wireless telemetry (350) of an indication that a particular PSU battery pack 205 needs charging, desk management computer may identify the desk 300 containing the particular PSU 200 by reference to the database of cross-references, displaying the desk identifier on the display 345 so that someone may be dispatched to locate the desk 300 and to connect the PSU 200 to a mains supply for recharging.

More advanced desk management facilities may also be provided, as will be described further below. In particular, the desk management computer 340 may also store or have access to a database recording a cross-reference between the LAN address of each wireless LAN interface 315 connected to PCs 305 mounted within identified desks 300 so that, on receipt for example of a low battery charge warning from a particular PSU 200, the desk management computer 340 may identify the desk 300 and hence the corresponding LAN address to enable a message to be sent to the PC 305 at that LAN address, if the PC is being used at the time, for display on the desk's flat panel display, warning the desk's current user of an impending loss of power in the desk 300.

There will now be described, with reference to FIG. 4, some preferred aspects of a desk management system 335 for use in monitoring and managing tetherless desks equipped with battery PSUs 200 described above with reference to FIG. 2. However, while the desk management system will be described in the context of a separate computer 340, the functions of the desk management computer 340 may alternatively be implemented on the LAN server 330 and the desk management system user interface made accessible from selected terminal equipment linked to the LAN 320.

Figure 4:
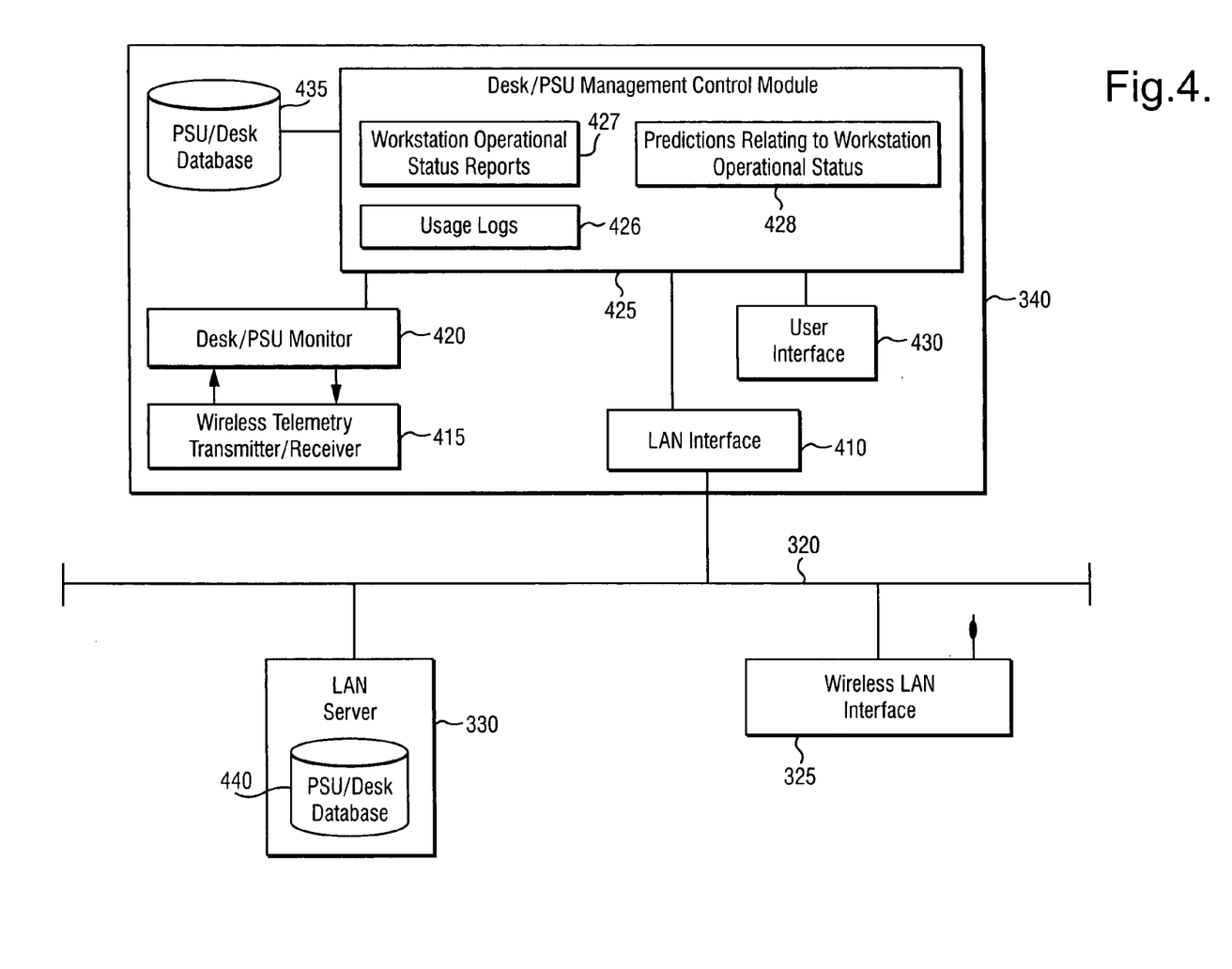
FIG. 4 is a diagram showing the functional features of a desk management system according a preferred embodiments of the present invention.

Referring to FIG. 4, a diagram is provided showing the functional features of a preferred desk management computer 340 for use in managing a number of tetherless desks 300 with PSUs 200 installed therein. In this particular embodiment, the desk management computer 340 is shown linked to the LAN 320 by means of a LAN interface 410, although the desk management computer 340 may also operate in a stand-alone arrangement if required. The desk management computer 340 comprises: a wireless telemetry transmitter/receiver 415 for receiving transmissions of diagnostic parameter data from PSUs 200 (note that the wireless telemetry transmitter/receiver may alternatively be externally provided, as shown—350—in FIG. 3); a desk/PSU monitor 420 for carrying out initial processing of telemetry signals received via the wireless telemetry receiver 415, for example time-stamping received data and converting those data into PSU-specific parameter records; a desk/PSU management control module 425 to implement the principal PSU/desk management functions of the desk management computer 340; a user interface 430 to provide user-access to the desk management functions; and a store 435 or access to a store, for example store 440 on LAN server 330, for holding a database relating to PSUs 200, desks 300 and, if required, LAN interfaces 315 deployed in desks 300 and users of those desks 300. Also shown in FIG. 4 is the wireless LAN interface 325 providing a communications path to a user of a tetherless desk 300 via the LAN 320 and a PC 305 mounted within the desk 300.

In operation, a number of different desk management functions may be provided by the desk management computer 340 for the benefit of a user responsible for ensuring trouble-free operation of a number of tetherless desks 300 as part of a flexible office arrangement. A preferred set of desk management functions, to be described in outline below, are based upon a combination of predetermined data, preferably recorded in a database (435, 440) stored within or accessible to the computer 340, and diagnostic parameter data received from PSUs 200 installed in the desks 300 to be managed. Output from particular desk management functions provided by the desk management computer 340 may also be made available to current users of desks insofar as it is relevant to operation of those specific desks. Such output may be communicated to specific desks currently in use by means of the wireless LAN.

In a preferred flexible office arrangement, for example that shown in FIG. 3, each tetherless desk 300 is provided with a PSU 200 as described above, and a PC 305 with a wireless LAN interface 315 connected to it. To each tetherless desk 300 is assigned a identifier, unique within the flexible office arrangement being managed. The identifier assigned to each desk 300 is stored in a database (435, 440) and physically printed on the respective desk 300 in a visible position. To each PSU 200 installed within desks 300 is assigned an identifier, unique among PSUs 200 used in the flexible office arrangement being managed. Each PSU identifier is stored both in the PSU 200 itself, in a store 235, and in the database (435, 440). In the database (435, 440), the assigned desk identifiers are cross-referenced to the corresponding assigned PSU identifiers. Facilities are provided by means of the user interface 430 to edit the records of PSU and desk identifiers as required.

At predetermined time intervals, each PSU 200 is arranged to transmit diagnostic parameter data available at the diagnostics interface 225, via the wireless telemetry equipment 250, 415, to the desk management computer 340. Each transmission of diagnostic data includes the respective PSU identifier (235) read by the PSU 200 from its store 235. Preferably, on receipt of a telemetry message, the desk/PSU monitor 420 creates a diagnostic record of the received diagnostics parameters and writes the time of receipt in each diagnostic record. The diagnostic records are passed to the desk/PSU management control module 425 to be stored in the store 435, 440 or processed in real time according to the desk management functions implemented in the computer 340.

In addition to recording details of desk identifiers and PSU identifiers, the database (435, 440) may also store details of LAN or IP addresses assigned to the wireless LAN interfaces 315 connected to PCs 305 in desks 300. A cross-reference between wireless LAN interface address and the respective desk identifier is also be recorded in the database (435, 440). Such records may also be edited by means of the user interface 430.

Further, the database (435, 440) may store details of user identifiers for users known to be using, or with a history of using tetherless desks 300 of the flexible office arrangement being managed. Preferably, the control module 425 may capture user identifiers when users log onto the LAN server 330. In this way, the particular desk 300 being used may be identified from the recorded cross-reference between the LAN or IP address of the wireless LAN interface 315 being used and a desk identifier. Having identified a particular user, the control module 425 may be associate any diagnostic parameter data gathered from the respective PSU 200 with that particular user and may keep a log of that user's demands upon the PSU 200 and other communications facilities provided by the desk 300.

In particular, the control module 425 is arranged to maintain a log 426 of the daily usage of each tetherless desk 300 identified in the database (435, 440). Use may include the number of hours of use (use being detected by user log-on/logoff records and by current supplied from the PSU 200), mean power consumed as calculated from diagnostic data providing voltage and current supplied by the respective PSU 200, and recharging times when the desk 300 is plugged in for recharging (220). If available, user details may also be recorded in the log. From this log data, numerous desk management functions may be implemented by the control module 425 for the benefit of users via the user interface. For example, the following set of information may be offered, preferably from a menu of options at the user interface 430 to generate workstation operational status reports 427 and/or predictions 428 relating to workstation operational status:

current battery charge level of each desk;
report of current status of a selected desk for all available diagnostic and user parameters;
use statistics for each selected desks;
report on expected battery life for each desk/PSU, including a warning as battery replacements become necessary;
schedule of recharging requirements for desks being managed, listing those desks (by their identifiers) needing to be plugged in for recharging at the end of the current day;
projected availability of power for a particular desk/PSU on the basis of use since the last recharge, optionally taking account of the particular user or users using the desk and their historical usage profiles;
recommendations for use of a particular identified desk according to the projected requirements of an identified user who has reserved a desk for a specified period of time. Recommendation may be based upon the known current battery charge levels of those desks available for use, the facilities offered by a particular desk (some desks may be more or less equipped and may have different sized batteries in their PSUs).

This set of information facilities is provided by way of example only. A skilled person aware of the data available within the desk management computer 340 would be able to devise further uses for that data, including further types of analysis to yield information useful for the management of tetherless desks.

There will now be described a further embodiment of the present invention having means to determine the physical location of tetherless desks 300 within an office space. Such a facility may be particularly useful where a large number of desks are deployed within an office space, all being moveable to any position within that space. Finding a particular desk identified as requiring attention by the desk management computer 340 may be less than easy if only the desk identifier is known.

It will be clear that there are a number of ways in which a particular desk can be located. A simple facility may be provided comprising a flashing light, mounted in a prominent position on a desk 300 and linked by a cable to a PSU 200 mounted in that desk 300. The flashing light may be triggered by a telemetry signal transmitted by the desk management system, identifying the PSU 200 by its assigned identifier, the telemetry signal being received at the PSU 200 telemetry transmitter/receiver 250 and, if the PSU identifier matches that stored in the store 235, the PSU 200 triggers the flashing light, making the desk clearly identifiable.

An alternative solution may be implemented using Bluetooth™ wireless technology, as described in documents accessible for example of the worldwide web. Bluetooth wireless devices having a range of about 10 meters are placed in the ceiling of an office space at, say, 5 meter intervals (one per 25 m² area), for use in locating desks and/or their PSUs 200 also carrying Bluetooth devices. Each ceiling-mounted Bluetooth device acts as a passive responder to received inquiry packets sent out by PSU or desk-mounted Bluetooth devices operating as "masters". Inquiry packets are only received by ceiling-mounted devices within range of the desk/PSU-mounted masters, also selected as having a 10 meter transmitting range. The ceiling devices would return their pre-allocated device addresses (BD_ADDR) in inquiry reply FHS packets. The database (435, 440) of the desk management computer 340 contains a record of the physical location (according to a predetermined office space locations scheme) of each ceiling-mounted Bluetooth device and its corresponding device address (BD_ADDR). The database (435, 440) also contains a record of the device address of each Bluetooth device mounted in a desk and/or a PSU 200 together with a cross-reference between the device address and the corresponding desk/PSU identifier. Once a desk/PSU-mounted Bluetooth device receives the address of one or more ceiling-mounted Bluetooth devices within range, that/those addresses are forwarded to the desk management computer 340 for example by means of a Bluetooth paging message to a Bluetooth device associated with the desk management computer 340, or via one of the other wireless signaling routes provided from the desk 300—wireless telemetry in respect of a PSU-mounted Bluetooth device, or the wireless LAN in respect of a device linked to the PC 305 mounted within the desk 300.

In this way, the physical location of any desk may be determined by the desk management computer 340, to a 5 to 10 meter resolution according to the range of bluetooth devices used, by looking up the physical location of the ceiling-mounted device whose address was returned in the latest message from a bluetooth device mounted the desk 300 or its PSU 200. In the event that a diagnostic data message received from a particular PSU 200 indicates that its desk needs attention, the latest bluetooth location data for that desk 300 or PSU 200 may be easily consulted and made available at the user interface 430.

Further variations on a bluetooth implementation of a desk/PSU location system may be readily devised while remaining within the scope of the present patent application.

In respect of the PSU 200 and the desk management computer 340, it will be clear to a skilled person in the art that various functional features may be moved from the desk management system to the PSU 200, for example means for storing identifiers other that the PSU identifier (235) and a store for storing log data relating to use of the PSU 200.

What is claimed is:

1. A battery power supply, said power supply comprising:
   a battery pack inside a power supply housing;
   an inlet external to the housing for an externally supplied charging current to terminals of said battery pack;
   a store for storing a unique identifier for said battery power supply;
   a diagnostics interface arranged to monitor and to output at least an indication of the level of charge in said battery pack and said unique identifier stored in said store; and
   a wireless communications interface for transmitting said output from said diagnostics interface to an external monitoring apparatus.

2. A battery power supply in claim 1, wherein said diagnostics interface is arranged to monitor and to output an indication of electrical current being output from said battery pack.

3. A battery power supply in claim 1 wherein said wireless communications interface comprises a wireless telemetry transmitter.

4. A tetherless workstation having installed therein a battery power supply as in claim 1 for supplying electrical power to equipment associated with said tetherless workstation.

5. A monitoring apparatus, for monitoring a plurality of battery power supplies as in claim 1, said monitoring apparatus comprising, in combination with said plural battery power supplies:
   a wireless communications interface for receiving signals output from the diagnostics interface of a battery power supply via its wireless communications interface; and
   means, responsive to data received at said wireless communications interface, to generate reports relating to the operational status of said plurality of battery power supplies.

6. Apparatus as in claim 5, including means for determining use of a battery power supply wherein said diagnostics interface is arranged to monitor and to output an indication of electrical current being output from said battery pack and for storing a log of said use in a store.

7. Apparatus as in claim 5, including analysis means for analyzing data received at said wireless communications interface and for generating predictions relating to the operational status of said plurality of battery power supplies.

8. A battery power supply comprising:
   a battery pack;
   an inverter for converting electrical output from said battery pack into a mains voltage electrical source;
   an inlet for an externally supplied charging current;
   a store for storing a unique identifier for said battery power supply;
   a diagnostics interface arranged to monitor and to output at least an indication of the level of charge in said battery pack, and to output said unique identifier stored in said store; and
   a wireless communications interface for transmitting an output from said diagnostics interface.

9. An apparatus, for monitoring a plurality of tetherless workstations having installed therein a battery power supply for supplying electrical power to equipment associated with the tetherless workstation and including a battery pack; an inlet for an externally supplied charging current; a store for storing a unique identifier for said battery power supply; a diagnostics interface arranged to monitor and to output at least an indication of the level of charge in said battery pack and said unique identifier stored in said store; and a wireless communications interface for transmitting an output from said diagnostics interface, said apparatus for monitoring comprising:

a wireless communications interface for receiving signals output from the diagnostics interface of a battery power supply;

a store for storing, in respect of each of said plurality of tetherless workstations, a unique workstation identifier and the unique identifier of a battery power supply installed therein; and means, responsive to data received at said wireless communications interface and to data stored in said store, for generating reports relating to the operational status of said tetherless workstations.

10. An apparatus as in claim 9, including means for storing a usage log in respect of at least one of said workstations.

11. An apparatus as in claim 10, including analysis means for analyzing data received at said wireless communications interface and data stored in said usage log and for generating predictions relating to the operational status of said tetherless workstations.

12. Apparatus as in claim 10, including means for identifying users of said tetherless workstations, and wherein said usage log includes data identifying respective users.

13. Apparatus as in claim 12, wherein said analysis means is arranged to generate predictions relating to the operational status of at least one of said workstations in respect of a particular user.

14. A flexible office arrangement comprising a plurality of tetherless workstations having installed therein a battery power supply for supplying electrical power to equipment associated with the tetherless workstation and including a battery pack; an inlet for an externally supplied charging current; a store for storing a unique identifier for said battery power supply; a diagnostics interface arranged to monitor and to output at least an indication of the level of charge in said battery pack, and to output said unique identifier stored in said store; and a wireless communications interface for transmitting an output from said diagnostics interface; said apparatus for monitoring said plurality of workstations comprising:

a wireless communications interface for receiving signals output from the diagnostics interface of a battery power supply;

a store for storing, in respect of each of said plurality of tetherless workstations, a unique workstation identifier and the unique identifier of a battery power supply installed therein; and means, responsive to data received at said wireless communications interface and to data stored in said store, for generating reports relating to the operational status of said tetherless workstations.

* * * * *